Feb. 17, 1970  J. N. HENSHAW  3,495,754
PNEUMATIC FASTENER INSERTING MACHINES
Filed Dec. 20, 1967  7 Sheets-Sheet 4
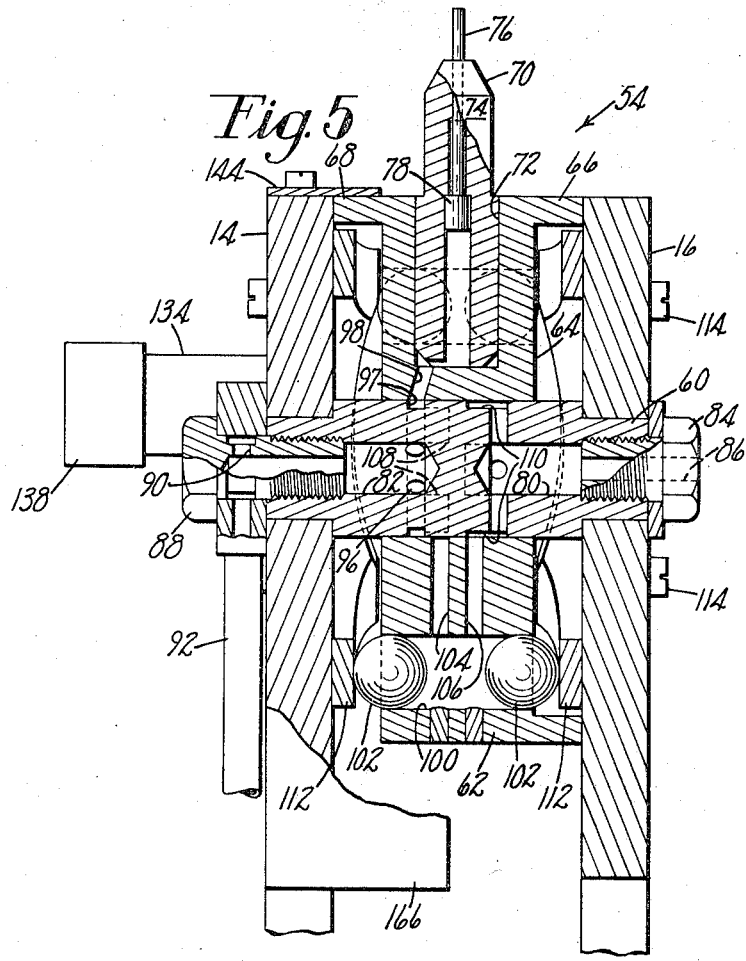
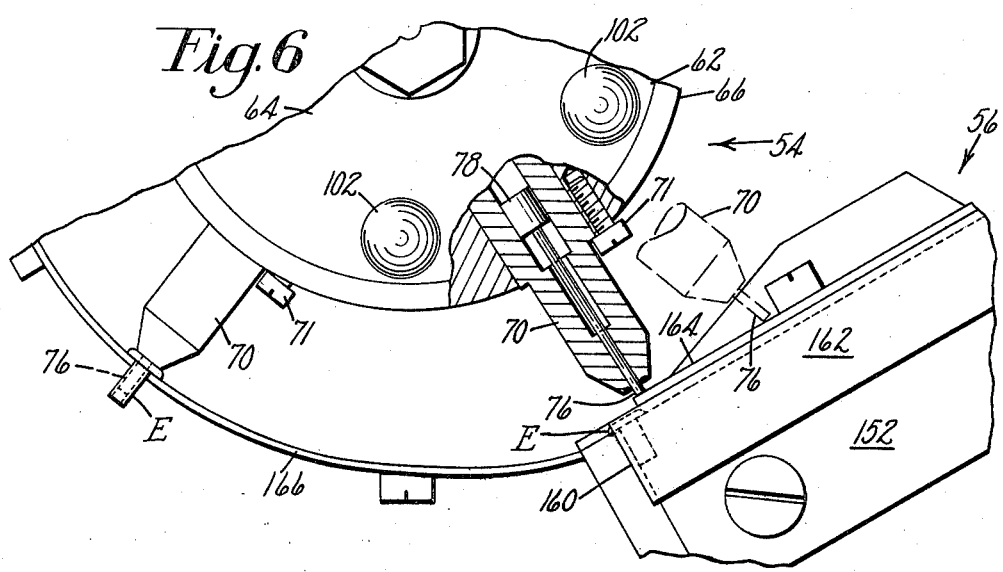

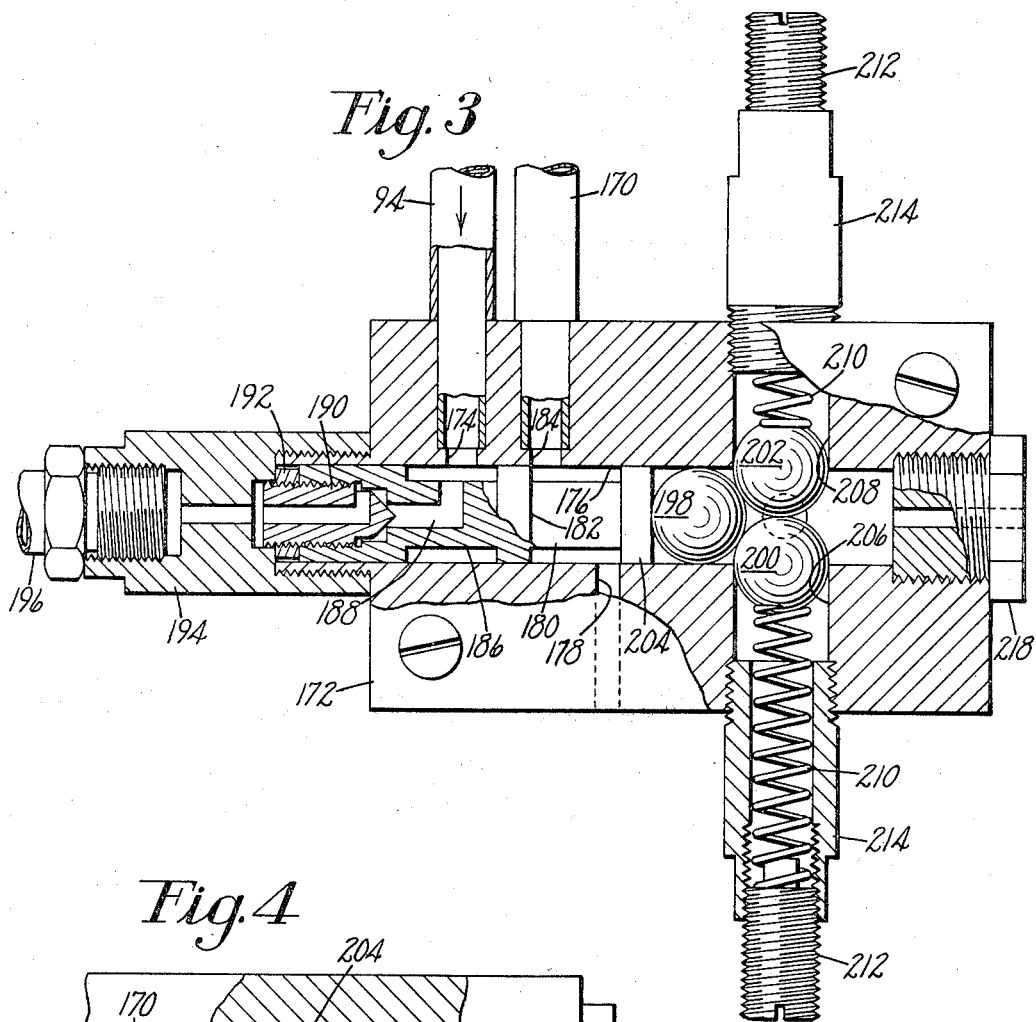
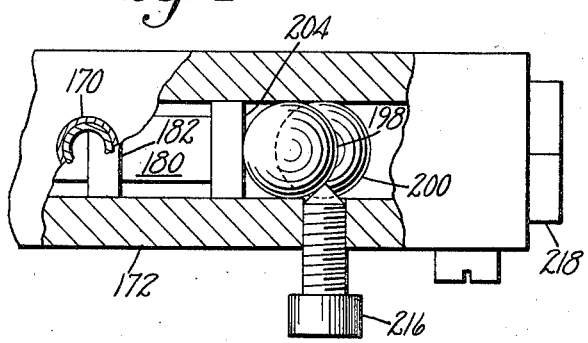

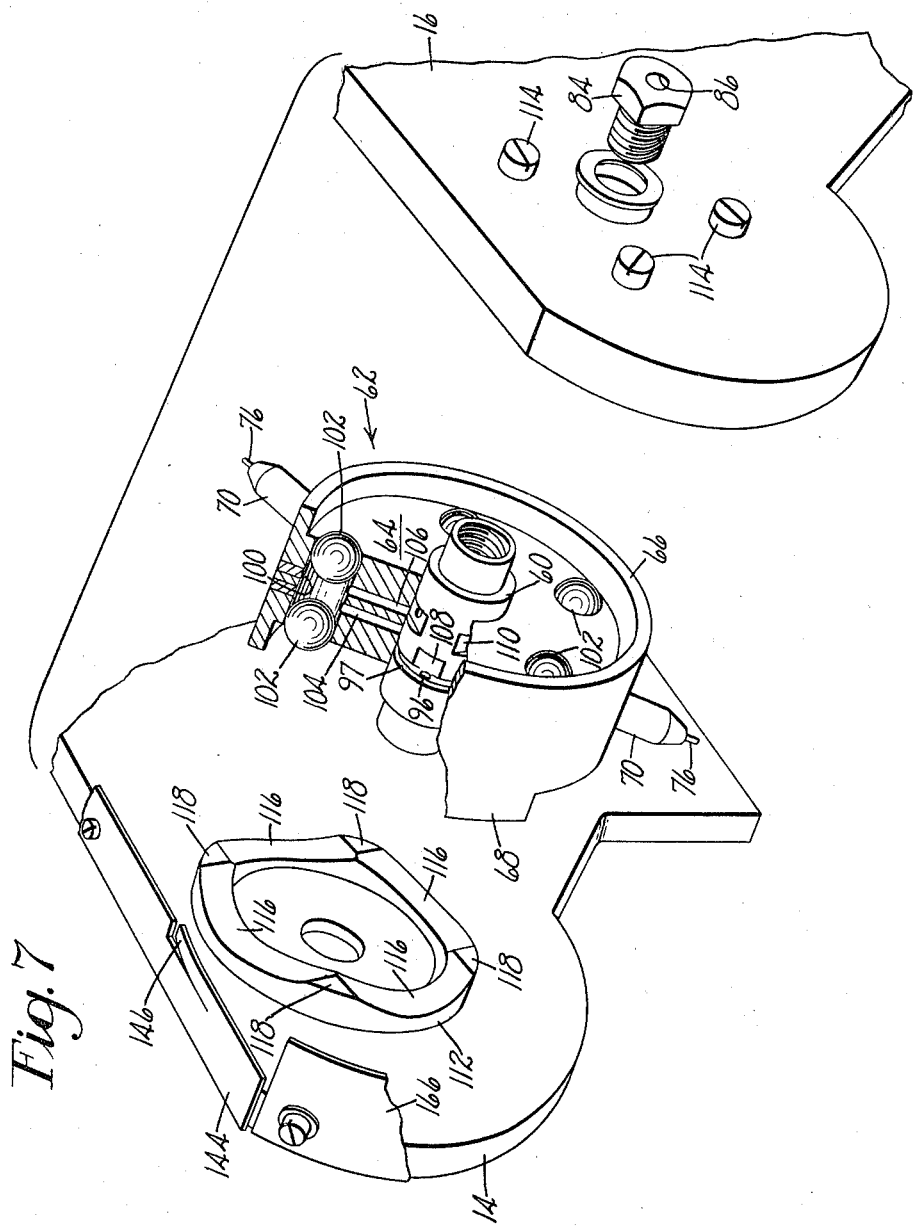

Feb. 17, 1970   J. N. HENSHAW   3,495,754
PNEUMATIC FASTENER INSERTING MACHINES
Filed Dec. 20, 1967   7 Sheets-Sheet 7

3,495,754
PNEUMATIC FASTENER INSERTING MACHINES
James N. Henshaw, Leicester, England, assignor to USM Corporation, Boston, Mass., a corporation of New Jersey
Filed Dec. 20, 1967, Ser. No. 692,042
Claims priority, application Great Britain, Feb. 25, 1967, 9,102/67
Int. Cl. B21j *15/06, 15/28*
U.S. Cl. 227—60                                                  11 Claims

ABSTRACT OF THE DISCLOSURE

A pneumatic machine, which may be small and portable, is particularly well adapted to set small tubular fasteners of the type commonly used in electrical work. A rotary lower die carrier is indexed to cause successive dies to pick off successive eyelets in a raceway and transfer them one at a time into an upper eyelet setting position for cooperation with an upper setting die, the operation of the dies being controlled pneumatically.

BACKGROUND OF THE INVENTION

Small eyelets, such as are frequently used in electronic assemblies commonly have a low mass, tend to be difficult to orient in uniform manner and generally thwart reliable continuous processing and insertion by automatic machinery. One mechanism suitable for feeding small tubular fasteners (having barrel diameters on the order of .050″, a flange diameter of about .105″, and a length of about .06″) is set forth for instance in United States Letters Patent No. 3,268,114, issued Aug. 23, 1966 on an application filed in the name of Albert E. Newton. The present invention is more particularly concerned with the transfer of successive small fasteners from the delivery end of their raceway and presentation of them singly to a setting position. In some respects the novel organization may be considered an improvement over a fastener inserting machine of the type disclosed in United States Letters Patent No. 3,179,319, issued on an application filed in the name of J. Barker et al. Employment of pneumatic operating means aside from avoiding electrical disturbance in electronic assembly plants permits a gentle handling and precise forming of fasteners and greater accommodation of variance in work pieces.

SUMMARY OF THE INVENTION

It is a primary object of this invention to provide an easily and quickly operated machine for installing small tubular assemblies and preferably one which is conveniently portable and inexpensive compared to eyeleters presently available commercially.

To this end the invention features pneumatically actuated upper and lower setting dies both of which are operable in the plane defined by their cooperative setting position and a raceway supplying the fasteners to be set, one of the dies being movable to carry successive fasteners from the raceway into said position. The illustrative machine comprises a lower die support rotatable about a horizontal axis and indexable to register five circumferentially disposed radially projecting dies successively with a single, reciprocable upper die. As herein shown the lower setting dies are provided with eyelet-impaling nipple pins respectively, the pins being urged pneumatically against the restraint of fixed cams some of which control positioning of the preformed eyelet flanges on the pins. A pneumatic mechanism under the control of an operator is effective to actuate the operating stroke of the upper die and synchronously to initiate indexing means within the die support whereby an opposed lower die presents a fastener to be installed in a work piece and another lower die, which has had its nipple pin retracted by a cam affixed to the raceway is reloaded by the pin sliding off the cam to impale the endmost fastener in the raceway.

BRIEF DESCRIPTION OF THE DRAWINGS

The foregoing and other features of the invention together with novel details in construction will now be described in greater particularity in connection with an illustrative embodiment thereof and with reference to the accompanying drawings, in which:

FIG. 3 is an enlarged view, largely in section of a control valve shown in FIGS. 1 and 2;
FIG. 4 is a detail view indicating an adjusting means for the valve of FIG. 3 as seen from above;
FIG. 5 is a section taken on the line V—V in FIG. 8 and showing details of a lower die assembly seen in FIG. 2;
FIG. 6 shows on a larger scale a portion of the lower die assembly cooperating with the delivery end of a raceway as observed in FIG. 2;
FIG. 7 is an exploded view in perspective of the lower die assembly including its operating means.

DESCRIPTION OF THE PREFERRED EMBODIMENT

Figure 1:
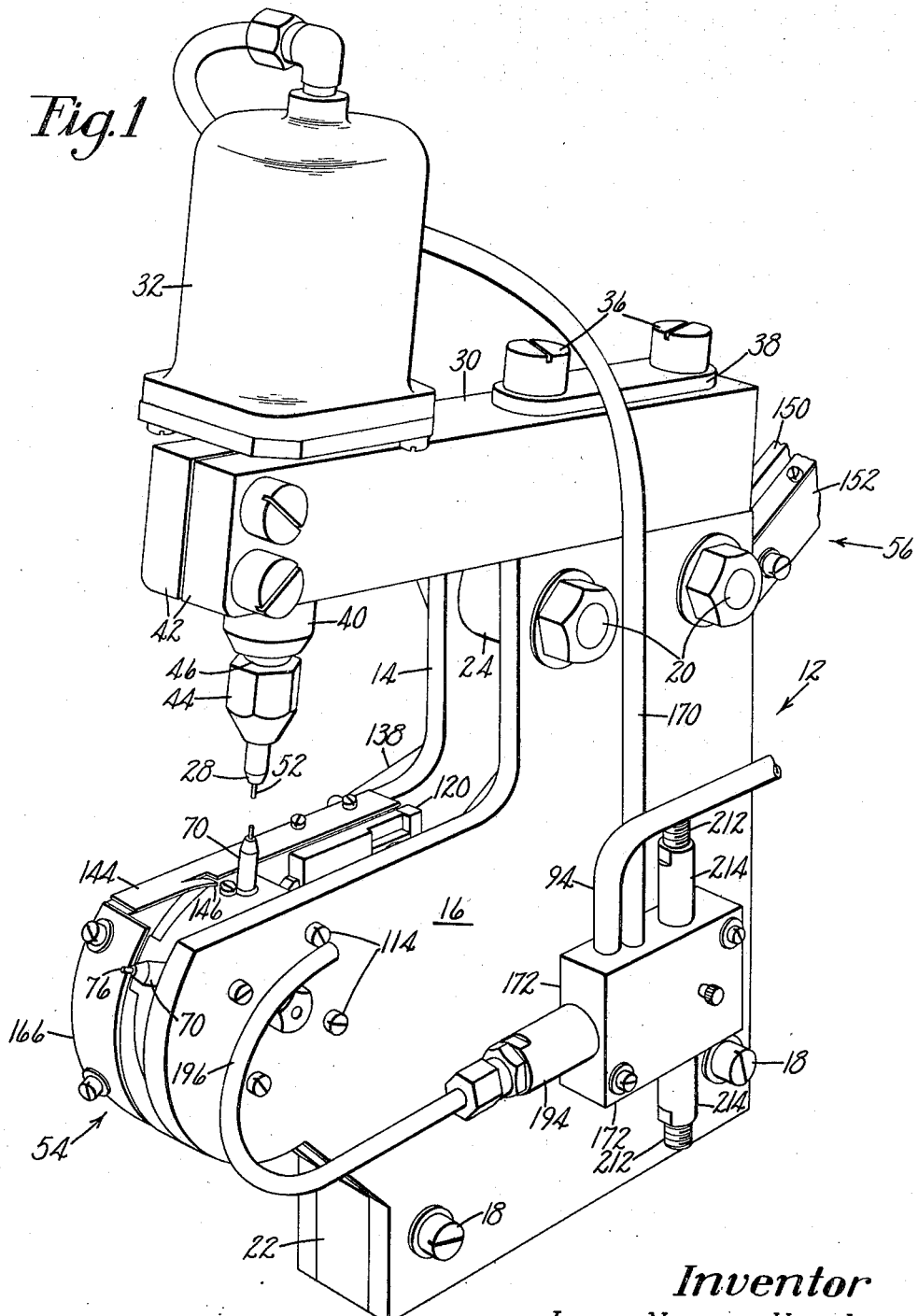
FIG. 1 is a perspective view of a pneumatic eyeletter.
Figure 2:
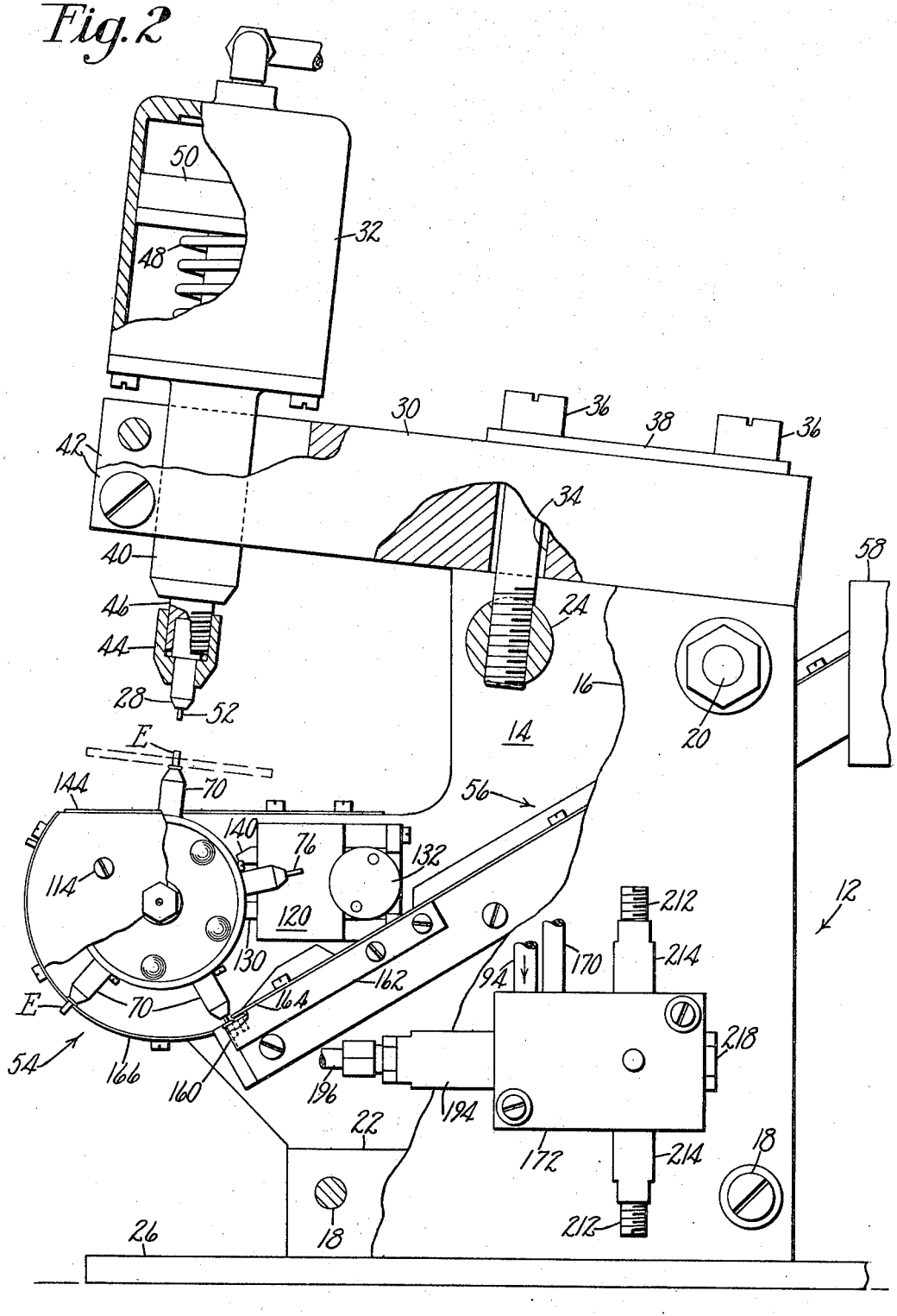
FIG. 2 is a view in side elevation of the machine shown in FIG. 1, portions being broken away to reveal internal structure.

The illustrative machine comprises a composite base 12 (FIGS. 1 and 2) having opposed side plates 14, 16 which are connected by a pair of lower bolts 18, 18 and a pair of upper bolts 20, 20, the lower bolts extending through a spacer block 22, and the upper bolts extending through spacing studs 24 respectively. The base 12 may be secured to a bench mounting plate 26 (FIG. 2). In order to permit adjustable mounting of a reciprocable upper setting die 28 in the machine, a block 30 carrying an upper die actuating cylinder 32 preferably is supported on slightly inclined upper edge surfaces of the side plates 14, 16 as will next be described. Parallel bores 34 (one only shown in FIG. 2) in the block 30 are oversized slidably to receive clamping bolts 36, respectively, the stems of which are threaded into the spacing studs 24, and the heads of which abut a plate 38 on the block 30. Heightwise adjustment of the upper die 28 in its retracted upper position is afforded by the cylinder 32 having a neck portion 40 clampable between slit end portions 42, 42 of the block 30. It will be understood that, as indicated in FIG. 2, the upper die 28 is secured by a nut 44 to the lower end of a piston rod 46 urged upwardly in the cylinder 32 by means of a return spring 48 acting on a piston 50.

For presenting successive tubular fasteners, for instance, small eyelets E (FIGS. 6, 10 and 11), to be set in exact axial alinement with a pilot pin 52 in the upper setting die 28, lower die supporting and presenting means generally designated 54 (FIGS. 2 and 5–7) is provided for cooperating with a fastener supply means herein shown as a fixed raceway 56. This raceway is adapted slidably to support the eyelets by their preformed flanges in a row. Any suitable type of means, for instance an air operated hopper, is provided at 58 (FIG. 2) for uniformly delivering successive eyelets from a mass supply into the raceway. The die supporting means 54 now to be described with particular reference to FIGS. 5–7 comprises a fixed horizontal shaft 60 reduced end portions of which are received in the side plates 14, 16. Rotatably mounted on the shaft 60 is a lower die supporting wheel 62 having a radial inner portion 64 in close fit with the shaft 60 and a cylindrical periphery 66, the latter being formed on one side for purposes later explained with five equispaced, axially projecting segments 68. Angularly alined with the latter are five lower dies 70 respectively removably secured in radial bores 72 (one shown in FIG. 5) of the wheel 62, for example by means of screws 71 (FIG. 6) the heads of which overhang a shoulder of the die. Each die 70 includes a tubular body 74 an outer conical end of which slidably receives a nipple pin 76 the projecting end of which is arranged and adapted to impale an endmost eyelet E in the raceway to be presented to the upper die 28 for setting. As will be explained each pin 76 is normally pneumatically urged outwardly to the limit determined by engagement of its inner head 78 with a shoulder formed within the body 74.

Air motor mechanism next to be described is provided for pneumatically urging rotation of the die supporting means 54 about its horizontal axis and simultaneous radial yielding movement of the pins 76. For this purpose the shaft 60 is formed with opposed axial bores 80, 82 (FIG. 5). The bore 80 threadedly receives a bolt 84 having an exhaust axial bore 86 extending completely through it. The bore 82 threadedly receives a bolt 88 formed with a radial inlet bore 90 adjacent its head and communicating through an axial bore in the bolt with the bore 82. While the machine is in use air under pressure (on the order of about 50 lbs. per square inch, for instance) is continually supplied through a pipe 92 (FIG. 5) to the inlet bore 90, and, incidentally also through a pipe 94 (FIGS. 1–3) for a control purpose later mentioned. It will be accordingly understood that air under pressure admitted into the bore 82 enters the tubular die bodies 74 via interconnecting ports 96, a circumferential groove 97 in the shaft 60, and ports 98 in the wheel 62, thus urging the pins 76 outwardly. Arranged between successive lower dies 70 and parallel to the adjacent periphery 66, the wheel is formed with a bore 100 for receiving in close slidable fit a pair of piston-like actuating balls 102 (FIGS. 5–7). In order to urge the respective pairs of balls 102 apart at times and thus into camming positions for urging rotation of the wheel 62, a pair of radial bores 104, 106 therein communicates between each bore 100 and chambers defined by flats 108, 110 respectively formed on the shaft 60, the flats 108 merging with the annular groove 97. The arrangement is such that the flats 108, 110 are angularly staggered, each subtending an arc of 45°. Thus, during rotation of the wheel by the means to be explained each bore 100 has its balls 102 alternately subjected to lateral separation by air pressure admitted via the flats 108 and then allowed to come together as air is exhausted via the bore 106, the flats 110 and the bolt bore 86.

For enabling the five pairs of balls 102 to impart rotation to the wheel 62, the effective torque per pair varying according to angular position at any instant, reaction cam rings 112, 112 (FIGS. 5 and 7) are respectively secured coaxially to the inner sides of the plates 14, 16 as by screws 114. Each ring 112 is formed with four arcuate axial face cam quadrants respectively having a low point 116 (FIG. 7) intermediate circumferentially spaced high points 118, 118. Axial displacement between the points 116, 118 does not exceed half the diameter of a ball 102 and may, for instance, be equal to about one-third thereof. In order to effect rotation of the wheel 62 clockwise as noted in FIG. 6 the rings 112 are angularly disposed so that the 45° arcs defined by the flats 108 coincide with four corresponding 45° ball-engaging arcs subtended by high points 118 and proceeding clockwise to the low points 116. Accordingly, any balls 102 under separating pressure in their bores 100 react on deepening portions of the quadrants of the rings 112 thereby urging continuous rotation to the die supporting means 54, and any balls 102 which might otherwise then be opposing such rotation because engaging cam faces becoming shallower, i.e. rising from a low point to a high point, are ineffective in their opposition for the reason that they are in bores 100 which are then prevented by the flats 110 from receiving air under pressure.

Figure 8:
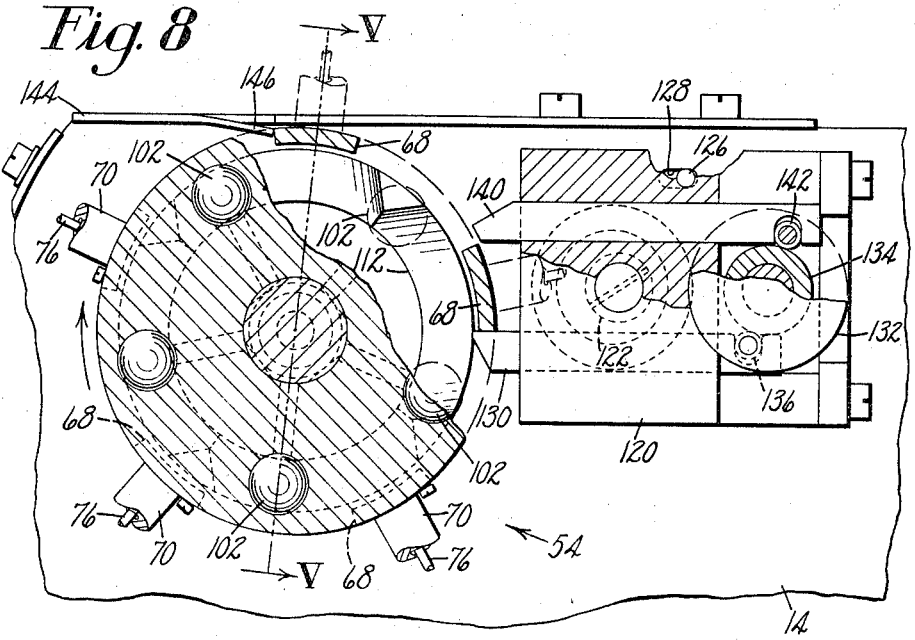
FIG. 8 is a view in side elevation, with portions broken away, of the lower die assembly and its indexing means.
Figure 9:
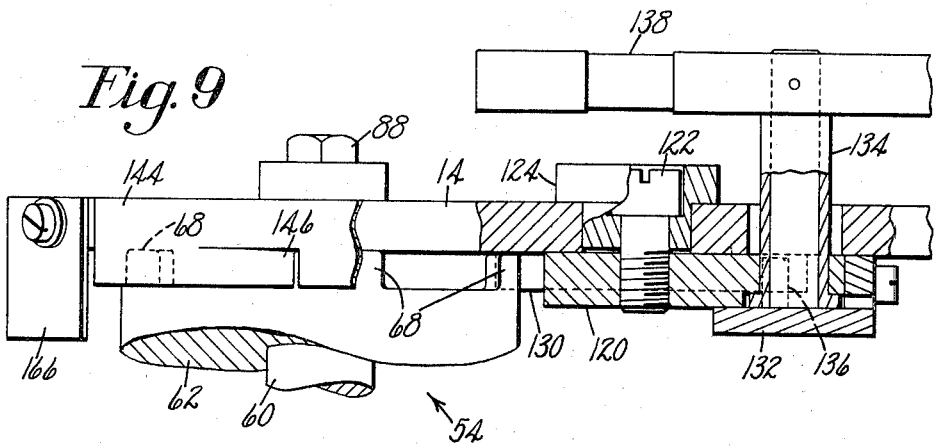
FIG. 9 is a plan view of mechanism shown in FIG. 8.

In order to align successive lower dies 70 with the upper die 28, whereby the latter can upset the eyelets presented thereto following inversion by the lower dies, escapement means is provided as will next be described with reference to FIGS. 8 and 9. A block 120 is secured to the inside of the plate 14 by a clamp screw 122. Preferably this screw extends through a hole arranged eccentrically in a collar of a headed bushing 124, the collar being recessed in the plate 14 and hence affording fine adjustment of the relative position of the block 120 with respect to the die supporting means 54. A pin 126 (FIG. 8) projects from the block 120 into a horizontal slot 128 in the side plate 14 to restrict the block adjustment. Leading axial edges of the five segments 68 are 72° apart and so disposed that when one engages a lower latch 130 slidably projecting in the block 120, one of the lower dies 70 is properly alined with the upper die 28. To permit disengagement of the latch 130 with a segment 68 and subsequent reengagement with a successive segment 68, a rock shaft 132 is mounted in a bearing bushing 134 extending through an oversized hole in the plate 14, and a head of the rock shaft 132 carries a pin 136 received in a transverse slot of the latch 130. Operation of the escapement is by means of a hand lever 138 (FIG. 5 and 9) pinned to an outer end of the rock shaft 132, the lever being weighted at one end to urge the latch 130 into segment-engaging position until the front end of the lever is depressed to retract and release the lower latch 130. An upper latch 140 also slidable in the block 120 and generally parallel to the latch 130 carries a pin 142 (FIG. 8) connected to the head of the rock shaft 132 and diametrically opposite to the pin 136. When the lower latch 130 is retracted from segment engagement, therefore, the upper latch is moved forwardly into the path of an oncoming segment 68 to insure against the lower die support 54 over-stepping. As shown in FIG. 8 in order to prevent a lower die 70 when in its upper or setting position from moving counterclockwise, a leaf spring 144 secured to the plate 14 has a tang 146 projecting for engagement with an edge of a segment 68 then in its upper position.

Figure 10:
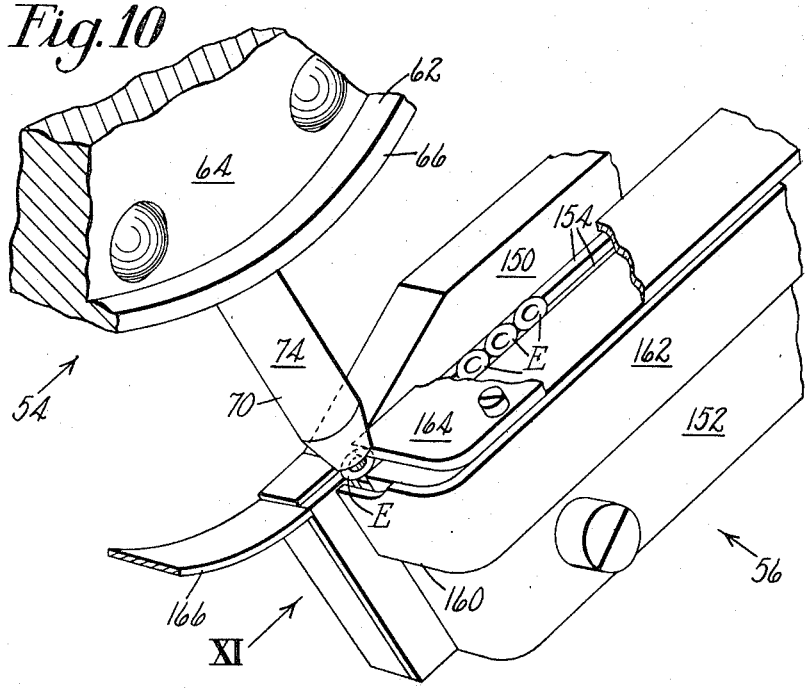
FIG. 10 is an enlarged perspective view of a lower die in pick-off position.
Figure 11:
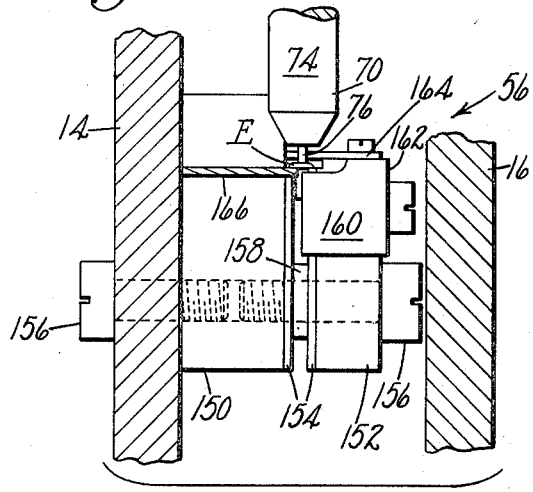
FIG. 11 is a view looking in the direction of the arrow 11 in FIG. 10 and showing an impaled eyelet at the pick-off locality.

A more detailed description will now be made of how the lower die 70 picks off endmost eyelet E in the raceway 56. Referring to FIGS. 10 and 11 the raceway includes a pair of parallel inclined, spaced rails 150, 152 between which eyelets E descend in single file as they slide on their preformed flanges upon opposed thin guides 154, 154 (FIG. 11). Preferably these guides are secured to the adjacent rails 150, 152 respectively by bolts 156 extending through coaxial bores in the side plate 14 and the rails, a spacing washer 158 being disposed on the bolts 156 between the guides 154 and having adequate thickness to assure accommodation of the eyelet barrels. The guide 154 adjacent to the rail 150 extends downwardly slightly more than the opposite guide 154 to cooperate with a detent in the form of a curved tip 160 of a leaf spring 162 secured to the rail 152 and thus position and support the endmost eyelets E for impaling by the successive nipple pins 76. Each pin 76 as it approaches an inclination of about 30° to the vertical will be yieldingly caused to retract within its body 74 by reason of engagement with a cover plate 164 secured on the raceway and serving as a cam. As soon as the pin 76 passes over the lower end of the plate 164, which does extend up to but not over the endmost eyelet E, the pin is released and urged by air pressure to impale that eyelet and then, as the die support means 54 continues to rotate, displaces the tip 160 from its restraining position. The flange of the impaled eyelet is then moved over the inner edge of an arcuate guide 166 (FIGS. 1, 2, 6, 7, and 10), which in effect is a continuation of one of the guides 154 to invert the eyelet. It will be understood that the tip 160 usually does not extend more than half way across the path of the endmost eyelet and, after being deflected by the nipple pin, springs back to restrain the next endmost eyelet in the raceway.

For manually cycling the upper setting die 28 relative to the lower die 70 which is in eyelet setting position, the piston 50 may be urged downwardly by air under pressure admitted into the cylinder 32 via a pipe 170 and a control valve housing 172 (FIGS. 1–4) secured to the side plate 16. For this purpose the inlet pipe 94 delivers compressed air to a port 174 of a cylindrical chamber 176 formed in the housing 172 and having an exhaust port 178 (FIG. 3). As shown in FIG. 3 when a valve 180 slidable in the chamber 176 is in its left-hand rest or exhaust position, a piston portion 182 of the valve is disposed between the port 174 and an outlet port 184 connecting with the pipe 170. Air above the working piston 50 may then escape to exhaust through the port 178. In this condition air is allowed to bleed from the pipe 94 into an annular groove 186 of the valve and through an axial bore 188, flow being restricted adjustably by a conically ended tubular screw 190 threaded axially into the valving and secured by a locknut 192. An adaptor 194 threaded onto an end of the valve housing 172 is coupled to a control tube 196 (FIGS. 1, 2 and 3) which thus continuously allows the escape of air, preferably away from an operator.

The valve 180 is yieldably held in its rest position in FIG. 3, the nut 192 engaging an internal stop shoulder of the adaptor 194, by a spring device comprising balls 198, 200 and 202. For this purpose a piston end 204 of the valve abuts the ball 198 which in turn abuts the balls 200, 202 respectively displaceable apart in transverse bores 206, 208 formed in the housing 172. The pressure to be exerted by the ball 198 in effecting separation of the balls 200, 202, and hence shifting of the valve portion 182 to the right as viewed in FIG. 3 for operating the upper setting die 28, is determined adjustably by springs 210, 210 in the bores 206, 208 respectively, the springs being adjustably compressed by screws 212, 212 respectively threaded into sleeves 214 which are themselves threadedly received in the bores 206, 208 respectively.

For initiating an upsetting stroke of the die 28 an operator simply blocks the air flow from the tube 196, for instance by momentarily placing his fingers tip over the end of the tube while holding a work piece (not shown) in position between the die 28 and the uppermost lower die 70. Consequent pressure build-up in the chamber 186 to the left of the valve portion 182, as viewed in FIG. 3, shifts the valve 180 to the right by overcoming resistance afforded by the balls 200, 202 to their separation by the ball 198. In thus moving, the valve groove 186 spans the inlet port 174 and the outlet port 184, and the valve portion 182 closes the exhaust port 178 whereby air under pressure is transmitted through the pipe 170 to the cylinder 32. For preventing excessive displacement of the balls 200, 202 to a non-return position, and hence for insuring return operation of the valve 180, a setscrew 216 (FIG. 4) is threaded into the housing 172 and has a conical end projecting internally for adjustable engagement with the ball 198. A bored plug 218 threaded into an end of the chamber beyond the balls 200, 202 prevents build-up of air pressure which could influence the ball resistance to shifting of the valve.

It is to be noted that once air pressure is sufficient to cause the ball 198 to begin to separate the balls 200, 202, only diminishing pressure is needed to cause them to separate further by reason of the decreasing angle of the tangents at the contact points of the ball 198 with the balls 200, 202 with respect to the axis of the chamber 176. Hence, once the operating stroke of the upper die 28 is started, it will continue rapidly to completion. The operator then unblocks the control tube 196 to relieve the pressure build-up and allow the springs 210, 210 to effect reopening of the exhaust port 178 and restoration of the valve 180 to its return position, whereupon the return spring 48 can act to lift the rod 46 together with the upper die 28 to their elevated rest positions.

Briefly to review a cycle of operation of the machine, an operator will depress the front end of the lever 138 to urge rotation of the lower die support means 54 by the air motor above described. This causes one lower die 70 previously loaded with an eyelet to move into setting position in alinement with the upper die 28, and causes another of the lower dies 70 to cooperate with the delivery end of the raceway 56 in impaling its endmost eyelet subsequently to be set. Next the operator places a work piece, usually preformed with its eyelet receiving hole, between the top lower die 70 and the upper die 28, an inverted eyelet on the lower die being received in the hole, and blocks the end of the control tube 196 to operate the die 28. Retraction of the latter from the setting position occurs on unblocking the tube 196, and the work piece with an eyelet E set therein may be removed from the top lower die 70 to permit preparation for the next cycle. It will be appreciated that operation is reliable, quiet, and affords considerable accommodation of irregularity in work piece dimensions by reason of the yieldabiilty in the operating parts.

Having thus described my invention, what I claim as new and desire to secure by Letters Patent of the United States is:

1. An eyeletting machine comprising opposed dies relatively movable together and apart to set an eyelet in an eyelet setting locality of a work piece, a raceway for supplying eyelets in uniformly oriented condition to a pick-up position, one of the dies having a yieldably projecting nipple pin and being movable between the eyelet setting locality and said pick-up position to enable the nipple pin to impale an eyelet thereat and return to said setting locality, and fluid pressure means for controlling the movements of said dies.

2. A machine as set forth in claim 1 wherein said one of the dies is carried by a support mounted for rotation about an axis normal to the axis of the nipple pin, the relative positions of the eyelet setting locality and the pick-up position being such that said one die rotates a part of a revolution about said axis of rotation to transfer each impaled eyelet to the setting locality.

3. In a machine for installing tubular fasteners such as eyelets, a reciprocable setting die, means for feeding fasteners successively in uniformly oriented condition to a pick-off point remote from the setting position of said reciprocable setting die, a carrier for a plurality of dies disposed and adapted respectively to a receive a fastener from said feeding means at the pick-off point and present it to said setting position of the reciprocable die, means for indexing the carrier, and other means under the control of an operator for actuting the reciprocable die when said carrier has been indexed.

4. In a machine for setting tubular fasteners, a raceway therefor having a delivery end, a setting die, rotary means for supporting a fastener presenting die, the latter being provided with a yieldable nipple pin arranged to pick off successive endmost fasteners in said delivery end, means for rotating said die supporting means about an axis to aline the presenting die with the setting die, and arcuate guide means disposed at least partly about said axis to restrain a pick-off fastener on the nipple pin.

5. In a machine for setting tubular fasteners, a reciprocable setting die, a plurality of fastener presenting dies, each of said presenting dies having an axially yieldable nipple pin, a raceway for supplying the fasteners to a delivery end and having a cam cover extending up to but not over the endmost fastener in said delivery end, and means for causing the presenting dies successively to move in a closed path wherein one of the presented dies is registered with the reciprocable die and another presenting die has its pin cooperative with said cam cover preparatory to impaling a fastener for subsequent registry with the reciprocable die.

6. In a fastener setting machine, a die supporting member mounted for rotation in substantially tangential relation to a raceway pick-off position and to a fastener setting position, an air pressure operated upsetting die cooperative with a die carried by said member, and an air motor for rotating said member.

7. In a fastener inserting machine a reciprocable setting die, a plurality of presenting dies cooperative with the setting die in its setting position, each of said presenting dies having a slidably projecting nipple pin and radially projecting from a rotatable support, a raceway for delivering fasteners to the nipple pins of the successive presenting dies, said raceway having a cam cover and a deflectable detent cooperative with the successive pins, an air motor for rotating the rotatable support while urging the pins radially outward, and an escapement mechanism cooperative with the air motor to align each successive presenting die with its pin and a fastener thereon with respect to the setting die.

8. A machine as set forth in claim 7 wherein the air motor is mounted within said rotatable support.

9. In an eyeletting machine, a frame, an upper setting die movably mounted on the frame, a plurality of lower setting dies respectively having a nipple pin for cooperating with the upper die, wheel means rotatably mounted in the frame for carrying said lower setting dies in equiangularly spaced relation, a raceway adjacent to the wheel means for delivering successive eyelets to be impaled by the pins of said lower setting dies, arcuate guide means for restraining the impaled eyelets on said pins during inversion of the eyelets, fluid pressure means for rotating the wheel to align successive lower dies and their eyelets with said upper die, and manually controlled fluid pressure means for operating the upper die when a work piece has been placed in eyelet receiving position on a pin aligned with the upper die.

10. In a fastener inserting machine a rotary support for a plurality of equi-spaced setting dies, each of said dies having a yieldable, radially projecting fastener impaling pin, and air motor means for rotating said support about an axis successively to move each pin from an inserting position to a fastener impaling position and return to the inserting position, said motor means comprising a shaft mounting said support, a series of ball pistons respectively displaceable in circularly arranged axial bores formed in the support, a stationary cam having reaction faces disposed to exert a circumferential thrust on said ball pistons, and means for introducing air under pressure through said shaft to control the cooperation of the ball pistons with said cam.

11. In a pneumatic fastener inserting machine, a setting die, an air motor having a spring-return reciprocable piston connected to said die, and a manually operable control means for shifting said die between an inoperative position and a setting position, said means comprising a valve housing having a bore, a valve slidable in the bore between a rest position and an operating position, an inlet port in the housing for delivering air under pressure to one side of a piston portion of the valve, two ports in the housing on the other side of the piston portion one communicating with said motor and the other being open to exhaust when not closed by said piston portion, means for adjustably resisting displacement of the valve from its rest position, and control means normally bleeding off air admitted to said inlet port and closable to shift said valve in opposition to said resistance means whereby the air motor is actuated.

References Cited

UNITED STATES PATENTS

| | | | |
|---|---|---|---|
| 602,881 | 4/1898 | Smith | 227—55 |
| 2,257,379 | 9/1941 | Havener | 227—61 |

GRANVILLE Y. CUSTER, JR., Primary Examiner